United States Patent [19]

Nozawa et al.

[11] Patent Number: 4,591,968
[45] Date of Patent: May 27, 1986

[54] NUMERICAL CONTROL METHOD

[75] Inventors: Ryoichiro Nozawa, Tokyo; Hideaki Kawamura; Mitsuto Miyata, both of Hachioji, all of Japan

[73] Assignee: Fanuc Ltd., Hino, Japan

[21] Appl. No.: 481,249

[22] Filed: Apr. 1, 1983

[30] Foreign Application Priority Data

Apr. 7, 1982 [JP] Japan .................................. 57-57714

[51] Int. Cl.⁴ ........................ G05B 19/18; G06F 15/46
[52] U.S. Cl. .................................... 364/167; 318/568; 364/191; 364/474
[58] Field of Search ................ 364/474, 475, 167–171, 364/191–193; 318/568

[56] References Cited

U.S. PATENT DOCUMENTS

| 3,616,993 | 11/1971 | McGuire et al. | 234/17 |
| 3,866,179 | 2/1975 | McGee et al. | 364/138 |
| 4,086,633 | 4/1978 | Kishi et al. | 364/474 |
| 4,092,720 | 5/1978 | Carey | 364/474 |
| 4,328,448 | 5/1982 | Berenberg et al. | 364/474 X |
| 4,404,506 | 9/1983 | Nishimura et al. | 408/8 X |

FOREIGN PATENT DOCUMENTS 0041336 12/1981 European Pat. Off. .
0046032 2/1982 European Pat. Off. .

OTHER PUBLICATIONS

European Search Report, completed 7/18/83, by Examiner Ressenaar at The Hague.

Primary Examiner—Joseph Ruggiero
Attorney, Agent, or Firm—Staas & Halsey

[57] ABSTRACT

A numerical control method for a numerical control device which executes processing based on a machining program composed of multiple items of numerical control command data such as numerical command data and G-code data. Each item of the G-code data is expressed in the form of an alphabetic character G, a numerical value following G, and a code following the numerical value. The method includes inserting the items of G-code data in the machining program at suitable locations, subsequently discriminating the G-code data, and causing the numerical control device to execute processing specified by the discriminated G-code data.

5 Claims, 8 Drawing Figures

Fig. 1
PRIOR ART

| G code | Group | Control Function | G code | Group | Control Function |
|---|---|---|---|---|---|
| G00 | 01 | Positioning | G45 | 00 | Tool offset expansion |
| G01 | | Linear interpolation | G46 | | Tool offset reduction |
| G02 | | Circular interpolation CW | G47 | | Tool offset double expansion |
| G03 | | Circular interpolation CCW | G48 | | Tool offset double reduction |
| G04 | 00 | Dwell | G73 | | Peck drilling cycle |
| G10 | | Offset value setting | G74 | | Counter tapping cycle |
| G17 | 02 | XY plane selection | G76 | | Fine boring |
| G18 | | ZX plane selection | G80 | 09 | Canned cycle cancel |
| G19 | | YZ plane selection | G81 | | Drilling cycle, spot boring |
| G20 | 06 | Input in inch | G82 | | Drilling cycle, counter boring |
| G21 | | Input in mm | G83 | | Peck drilling cycle |
| G22 | 04 | Stored stroke limit ON | G84 | | Tapping cycle |
| G23 | | Stored stroke limit OFF | G85 | | Boring cycle |
| G27 | 00 | Reference point return check | G86 | | Boring cycle |
| G28 | | Return to reference point | G87 | | Back boring cycle |
| G29 | | Return from reference point | G88 | | Boring cycle |
| G30 | | Return to 2nd reference point | G89 | | Boring cycle |
| G40 | 07 | Cutter compensation cancel | G90 | 03 | Absolute programming |
| G41 | | Cutter compensation left | G91 | | Incremental programming |
| G42 | | Cutter compensation right | G92 | 00 | Programming of absolute zero point |
| G43 | 08 | Tool length compensation + direction | G94 | 05 | Feed per minute |
| G44 | | Tool length compensation − direction | G95 | | Not used |
| G49 | | Tool length compensation cancel | G98 | 10 | Return to initial point in canned cycle |
| | | | G99 | | Return to R point in canned cycle |

G54.1   G54,A    G54(1)
G54.2   G54,B    G54(2)

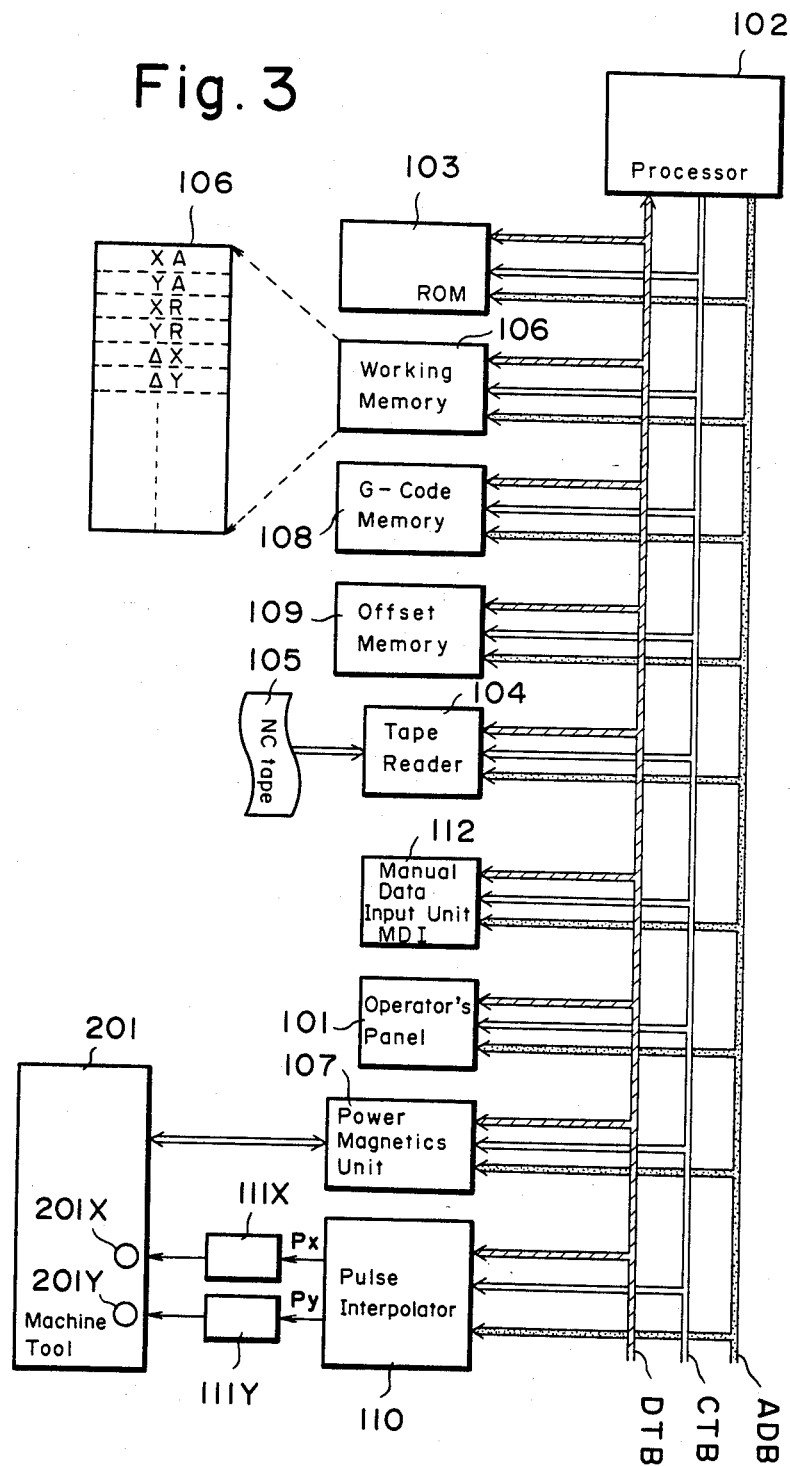

NUMERICAL CONTROL METHOD

BACKGROUND OF THE INVENTION

This invention relates to a numerical control method and, more particularly, to a numerical control method adapted so that G-code data may be expressed in the form of the letter G, a numerical value following the letter G, and a code following the numerical value.

A numerical control device, referred to as an NC device, is adapted to read numerical control data such as positional data, M-code data and G-code data from a tape or internal memory sequentially in a block-by-block fashion, and to execute processing based on the numerical control data to control a machine tool. The G-code data mentioned above specifies the control function of the NC device and is expressed by the letter of the alphabet G and a two-digit numerical value following the letter G. When an item of G-code data is commanded, the NC device performs preparatory and processing operations to perform the control function indicated by that item of G-code data.

FIG. 1 is a table showing the correspondence between various items of conventional G-code data and control functions. Items of related G-code data are grouped as follows: (a) G00 to G03; (b) G17 to G19; (c) G20, G21; (d) G22, G23; (e) G40 to G42; (f) G43, G44, G49; (g) G73 to G89; (h) G90, G91; (i) G94, G95; and (j) G98, G99. Each of the items of G-code data in the same group comprises so-called modal information with respect to the other items in that group. This means that when one item of G-code data is commanded, the item of data is effective until another item of G-code data in the same group is commanded. For example, the items of G-code data "G90", "G91" indicative of absolute and incremental inputs, respectively, belong to the same group and together form modal information. Once G90 is commanded, therefore, the NC device will recognize an entered positional command value as an absolute positional command until G91 is commanded. It should be noted, however, that the items of G-code data in the groups "00" are not modal type information change commands. In other words, each of the codes in group 00 is effective only in the block in which it is commanded.

As described above, an item of G-code data according to the prior art is commanded by the letter G and a numerical value following G. When it is desired to provide an additional control function, conventional practice is to establish a corresponding G code with a number larger than the other G codes, namely to increase the numerical value which follows the letter G. A disadvantage with this method, however, is that it becomes quite difficult to store the correspondence between the items of G-code data and the G-code data control functions as the G codes grow large in number, and the programmer is compelled to refer repeatedly to a correspondence table, making programming a troublesome and time-consuming task. An attempt at a solution to this problem has been to adopt consecutive numbers for the numbers (namely the numerical values following G) attached to related items of G-code data, but this entails changing G-code data numbers each time it is necessary to add a new control function. Even if consecutive numbers are set aside in advance and left open in anticipation of later being assigned to new control functions, the G-code numbers will still need to be changed when all of the open numbers are eventually used and none are left for assignment to new control functions which may be need to be included. This in turn will necessitate the modification of program specifications and will complicate programming.

SUMMARY OF THE INVENTION

Accordingly, an object of the present invention is to provide a numerical control method through which additional items of G-code data can be provided in a simple manner.

Another object of the present invention is to provide a numerical control method which enables a programmer to store the correspondence between G-code data and control functions with facility.

Still another object of the present invention is to provide a numerical control method through which items of G-code data which mutually constitute modal information can be gathered into the same group without requiring a change in the corresponding relationship between G-code data and their control functions, even when there is a large quantity of G-code data used for commanding or specifying related or similar control functions, or when there is a need for additional items of G-code data.

A further object of the present invention is to provide a numerical control method capable of simplifying processing for renewing the contents of a G-code memory by establishing correspondence between the numerical value following the letter G and an address of the G-code memory, and between a numerical value or letter of the alphabet, which follows a period or like symbol, and a bit position at said address.

According to the present invention, these and other objects are attained by providing a numerical control method for a numerical control device which executes processing based on a machining program composed of multiple items of numerical control command and or instructions such as numerical command data and G-code data or instructions. Each item of the G-code data is expressed in the form of an alphabetic character G, a numerical value following G, and a code following the numerical value. The method includes inserting the items of G-code data in the machining program at suitable locations, subsequently reading the machining program and executing the numerical control processing prescribed, discriminating the G-code in the machining program being read, and causing the numerical control device to execute processing specified by the numerical value following the character G and the code following the numerical value of each item of discriminated G-code data. Items of G-code data are arranged in a plurality of groups, in which items belonging to the same group have identical numerical values following the character G.

Other features and advantages of the present invention will be apparent from the following description taken in conjunction with the accompanying drawings.

BRIEF DESCRIPTION OF THE DRAWINGS

FIG. 1 is a table showing the correspondence between various items of G-code data and control functions, as well as items of G-code data classified into groups, in accordance with the prior art;

FIG. 2, including

FIG. 3 is a block diagram of a numerical control device for practicing a numerical control method according to the present invention;

DESCRIPTION OF THE PREFERRED EMBODIMENT

Figures 2A, 2B, 2C, 4:
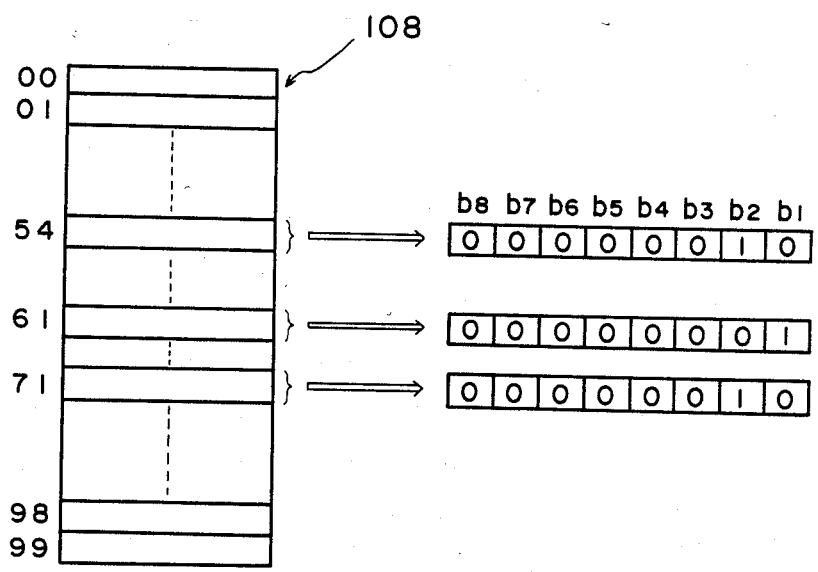
FIGS. 2A–2C, are examples of G-code data formats that can be used in accordance with the present invention.
FIG. 4 is a diagram of how items of G-code data are stored in a G-code data memory.

As shown in FIG. 2, an item of G-code data according to the present invention is represented by the alphabetic character (letter) G, a numerical value following the character G, and a code which follows the numerical value. In the example of FIG. 2A, an item of G-code data is composed of the character G, a two-digit numerical value following G, a period symbol following the two-digit numerical value, and a one-digit numerical value following the period. Similarly, in the example of FIG. 2B, an item of G-code data may consist of the character G, a two-digit numerical value, a comma symbol, and an alphabetic character, each following the other in the stated order. In the example of FIG. 2C, the item of G-code data may be represented by the character G, the two-digit numerical value following G, and a one-digit numerical value, which is enclosed in parentheses, following the two-digit numerical value. Note that the period, comma and parentheses serve as examples of symbols only and are not the only symbols capable of being used to form the code attached to the two-digit numerical value. Thus, an item of G-code data according to the invention can be created by attaching a code comprising a combination of any symbol, such as a period, colon, parentheses, semicolon or slash mark, and a numerical value or alphabetic character. Note also that the numerical value following the character G may comprise a single digit, rather than the two digits in the illustrated example.

Reference will be made to the block diagram of FIG. 3 to describe an NC device for practicing a numerical control method according to the present invention. The device includes an operator's panel 101 having a mode selection switch and start button, which are not shown. When the operator presses the start button after selecting an automatic run mode, a processor 102, which is under the control of a control program stored in a ROM 103, causes a tape reader 104 to read in NC data in block-by-block fashion from an NC tape 105. The processor 102 proceeds to read the NC data and store the same in a working memory 106, and then decodes the data in accordance with the control program to execute the numerical control processing prescribed by the data. Specifically, if an item of the NC data is an M-function instruction, S-function instruction or T-function instruction, a signal indicative of the instruction is delivered to a machine tool 201 through a power magnetics unit 107. If an item of NC data read in from the NC tape 105 is a G-code item, then the item of G-code data is stored in a G-code memory 108. In the latter, one bit of storage is allocated to one item of G-code data. When a prescribed item of G-code data is commanded, the bit corresponding thereto goes to logical "1"; bits corresponding to other items of G-code data, which are modals with respect to the command item of G-code data, go to logical "0".

The foregoing will be better understood from FIG. 4, illustrating the manner in which G-code data is stored in the G-code memory 108. The latter has storage areas located at addresses 00 through 99, each address location comprising, say, eight bits $b_1$ through $b_8$. Assume that an item G-code data is expressed in terms of the character G, a two-digit number following G, and a code following the two-digit number, the code comprising a period and a numerical value which follows the period, as shown in FIG. 2A. According to a feature of the present invention, correspondence is established between the two-digit number and an address of the G-code memory 108, and between the numerical value following the period and a bit position at said address. Establishing such correspondence vastly simplifies the processing for storing G-code data in the G-code memory 108. When the same two-digit (or one-digit) numerical value follows G in two or more G codes, as is the case in each of the examples of FIGS. 2A, 2B and 2C, this shall be taken as indicating G codes of the same group, i.e., modals. In other words, processing for writing the G-code memory 108 anew can be carried out with facility by treating as modals those items of G-code data having the same numerical value following the letter G. By way of example, assume that the following G functions, which are modals with respect to one another, are designated by G54.1, G54.2, G54.3 and G54.4, respectively: positioning in rapid traverse mode, linear interpolation in cutting feed mode, clockwise circular interpolation, and counter-clockwise circular interpolation. Then, when G54.1 is the command read in from the NC tape 105, it will suffice if 00000001 is stored at address 54 of the G-code memory 108. Likewise, when G54.2, G54.3 and G54.4 are the commands, it will suffice to store 00000010, 00000100 and 00001000 at address 54 of the G-code memory 108, respectively. This facilitates greatly the processing for writing the contents of memory 108 anew.

Further, G61.1 and G61.2 are items of G-code data that are modals with respect to each other. G61.1 indicates that an item of positional data is being commanded in the form of an absolute value, and G61.2 indicates that it is being commanded in the form of an incremental value. Likewise, code data G71.1, G71.2 and G71.3 are items of G-code data that are modals with respect to each other. G71.1 indicates cancellation of cutter offset (tool diameter), G71.2 is G-code data indicating that the tool path is to be offset by a predetermined offset quantity to the left side of the direction of tool advance, and G73.3 is G-code data indicating that the tool path is to be offset by a predetermined offset quantity to the right side of the direction of tool advance. The offset quantity is specified by entering, from the NC tape 105, either the item of G-code data G71.2 or G71.3, together with an alphabetic character D and a two-digit numerical value following D. By entering the foregoing data, the offset quantity is read out of an offset memory 109 from an address designated by the two-digit numerical value which follows the character D.

When an item of NC data read in from the NC tape 105 is path data, the processor 102 first examines the contents of the G-code memory 108 to determine which item of G-code data was the last commanded in each group related to path control. For example, assume that "00000010", "00000001" and "00000010" are the items of data located at addresses 54, 61 and 71, respectively, of the G-code memory 108, as shown in FIG. 4. In other words, among the groups related to path control, assume that the items of G-code data commanded most recently were G54.2 (linear interpolation in cutting feed mode), G61.1 (absolute programming), and G71.2 (cutter offset left), respectively. Under these conditions the processor 102, according to the control program, will execute processing for cutter offset, creation of incremental values and linear interpolation, corresponding to the foregoing items of G-code data. The process steps will be described later with reference to FIG. 5. The foregoing processing provides X- and Y-axis amounts of movement $_\Delta X$ and $_\Delta Y$ to be traversed by the tool over a short length of time $_\Delta T$, the processor 102 applying signals indicative of $_\Delta X$ and $_\Delta Y$ to a pulse distributor 110, shown in FIG. 3. Values of $_\Delta X$ and $_\Delta Y$ are successively found and applied to the pulse distributor 110 by the processor 102 at intervals of $_\Delta T$ until the tool (or any object being controlled) arrives at the commanded position. The pulse distributor and interpolator 110, in response to the $_\Delta X$, $_\Delta Y$ inputs thereto, performs a linear interpolation operation simultaneously along the two axes (X and Y axes), producing distributed pulses Px and Py that are applied to X-axis and Y-axis servo units 111X and 111Y, respectively. These respond by driving respective servomotors 201X and 201Y into rotation, thereby transporting the tool.

In FIG. 3, numeral 112 denotes a manual data input unit for setting offset quantities and for modifying NC data. ADB denotes an address bus, DTB a data bus, and CTB a control bus.

Figure 5:
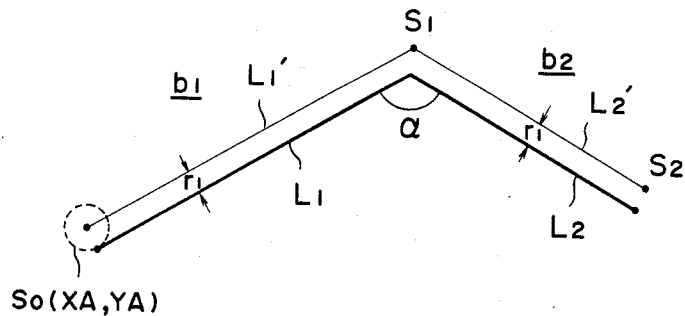
FIG. 5 is a diagram useful in describing processing associated with the numerical control method of the present invention.

Reference will now be made to FIG. 5 for describing processing executed by the processor 102 when the commanded items of G-code data are G54.2 (linear interpolation , G61.1 (absolute programming) and G71.2 (cutter offset left). The programmed path in FIG. 5 is composed of two straight lines L1 and L2, which intersect at an angle α greater than 90° but less than 180°. The processor 102 pre-reads a move command located in the present block b₁ and a move command located in the next block b₂, derives straight lines L1' and L2' obtained by applying a specified offset quantity r₁ to the straight lines L1 and L2 in the present block b₁ and the next block b₂, respectively, and computes the coordinates of the point S1 at which L1' and L2' intersect, these then being stored in the working memory 106. Next, the processor 102 finds the X- and Y-axis components Xi and Yi of a line segment So, S1 extending from an end point So in the previous block to the end point S1 in the present block. Note that the coordinates XA and YA of the point So are the coordinates of the current position of the tool and have been stored in the working memory 106 by previous processing.

Upon finding the X- and Y-axis components Xi and Yi, the processor 102 stores them in the working memory 106 as remaining amounts of movement XR and YR, respectively, and performs the following operations to compute the X- and Y-axis amounts of movement $_\Delta X$ and $_\Delta Y$ to be traversed during the predetermined time $_\Delta T$:

$$\Delta X = Fx \cdot \Delta T \quad (1)$$

$$\Delta Y = Fy \cdot \Delta T \quad (2)$$

The values of $_\Delta X$ and $_\Delta Y$ are stored in a storage area of the working memory 106 and are fed into the pulse distributor 110. Note that $_\Delta T$ in the foregoing equations is a preset quantity. Further, Fx and Fy are the feed speeds along the X and Y axes, respectively, and are decided by the following equations in which F is the commanded feed speed:

$$Fx = F \cdot Xi / \sqrt{Xi^2 + Yi^2} \quad (3)$$

$$Fy = F \cdot Yi / \sqrt{Xi^2 + Yi^2} \quad (4)$$

Upon receiving the $_\Delta X$ and $_\Delta Y$ inputs, the pulse distributor 110 executes a linear interpolation simultaneously along the X and Y axes. With each lapse of the time $_\Delta T$, the processor 102 computes values of $_\Delta X$ and $_\Delta Y$ anew and accumulates the resulting values along the respective axes. In other words, the processor 102 executes the operations given by:

$$XA + \Delta X \rightarrow XA \quad (5)$$

$$YA + \Delta Y \rightarrow YA \quad (6)$$

to update the coordinates XA and YA of the current position, which coordinates are then stored in the working memory 106. The processor also performs the following operations with each lapse of the time $_\Delta T$:

$$XR - \Delta X \rightarrow XR$$

$$YR - \Delta Y \rightarrow YR$$

to update the remaining amounts of movement stored in the working memory 106. When the processor 102 senses that the conditions $XR \geq \Delta X$, $YR \geq \Delta Y$ occur, namely that the remaining amounts of movement XR and YR along the X and Y axes are equal to or greater than the incremental values $_\Delta X$ and $_\Delta Y$, respectively, $_\Delta X$ and $_\Delta Y$ are applied to the pulse distributor 110. On the other hand, if it is sensed that the conditions $XR < \Delta X$, $YR < \Delta Y$ occur, then XR and YR are applied to the pulse distributor 110. The tool is thus moved to the target position. When the tool arrives at the target position (i.e. XR=0, YR=0), the processor 102 causes the tape reader 104 to read in the next block of NC data and then performs the prescribed peocessing in the manner described above.

Figure 6:
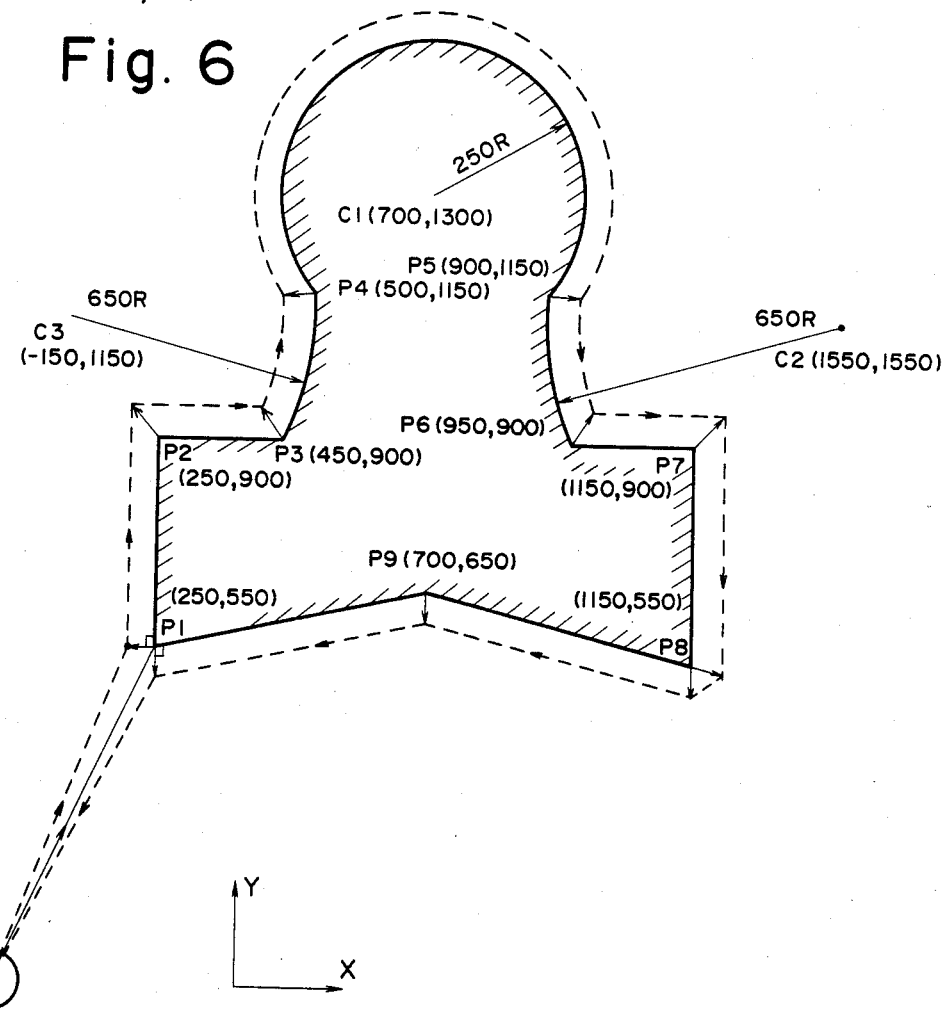
FIG. 6 is a diagram useful in describing a path traversed by a tool according to the method of the present invention.

FIG. 6 is a diagram useful in describing the path followed by a tool in accordance with the method of the present invention. The solid line indicates the programmed path, and the broken line the path that is actually followed by the axis of the tool. An example of the machining program is as follows:
G61.1 G54.1 G71.2 D07 X250.0 Y550.0;
G54.2 Y900.0 F150;
X450.0;
G54.4 X500.0 Y1150.0 I-600.0 J250.0;
G54.3 X900.0 I200.0 J150.0;
G54.4 X950.0 Y900.0 I650.0 J0;
G54.2 X1150.0;
Y550.0;
X700.0 Y650.0;
X250.0 Y550.0;
G54.1 G71.1 X0 Y0;

Although the numerical control method is described and illustrated in detail in accordance with the drawings hereinabove, the present invention should not be limited to the particular embodiment. It is possible to express G-code data for setting a plurality of coordinate-systems by G54.1, G54.2, G54.3 . . . , G-code data for programmable mirror image cancel by G50.1, G-code data for programmable mirror image by G51.1; and G-code data for modal macro call by G66.1, G-code data for modal macro cancel by G67.1. In accordance with the present invention as described and illustrated hereinabove, additional G codes can be provided in a very simple manner and correspondence between G codes and the functions specified by them can be established with facility. Furthermore, even when there are a large number of G codes indicative of related functions, or when there is a need to add new G codes, the G codes can be formed into groups without altering the correspondence already between G codes and their associated functions. In addition, processing for writing anew the contents of the G-code memory 108 is greatly simplified owing to the correspondence established between the numerical value following the character G and an address of the G-code memory 108, as well as between the numerical value or alphabetic character in the code following the first-mentioned numerical value, and a bit position at said address.

As many apparently widely different embodiments of the present invention can be made without departing from the spirit and scope thereof, it is to be understood that the invention is not limited to the specific embodiments thereof except as defined in the appended claims.

What we claim is:

1. A method for a numerical control device which executes numerical control processing based on a machining program composed of multiple items of numerical control command data such as numerical command data and G-code data which are stored in a machining program memory in blocks, comprising the steps of:
   (a) inserting the G-code data in the machining program at appropriate locations, each item of the G-code data comprising an alphabetic character G, a first code following the alphabetic character G, and a second code following the first code, the first code defining one of several groups of items of G-code data, a storage area being provided for each group, and the first and second codes specifying a type of processing;
   (b) executing numerical control processing upon reading the machining program out of the machining progam memory one block at a time;
   (c) discriminating whether read numerical control command data in the machining program is G-code data;
   (d) discriminating one of the items of G-code data;
   (e) executing, using the numerical control device, processing specified by the discriminated item of G-code data until another one of the items of G-code data belonging to the same group is discriminated;
   (f) specifying the storage area by the first code following the character G;
   (g) designating a bit position in the specified storage area by the second code;
   (h) assigning, when an item of G-code data is discriminated, only the bit position of the storage area designated by the item of G-code data a logical value of "1"; and
   (i) assigning all other bit positions of the storage area a logical value of "0".

2. A method according to claim 1, wherein step (e) comprises executing, by the numerical control device, a prescribed control operation in dependence upon the logical values in each of the storage areas.

3. A method according to claim 1, wherein said first and second codes are first and second numerical values separated by a period.

4. A numerical control method using a processor and a G-code memory to execute numerical control instructions including G-code instructions having a G-code label, a numerical value and a code, said method comprising the steps of:
   (a) reading the numerical control instructions one at a time;
   (b) determining whether the numerical control instruction is a G-code instruction;
   (c) accessing a memory location in the G-code memory designated by the numerical value if the numerical control instruction is a G-code instruction;
   (d) changing a bit designated by the code at the memory location to a first logical value if the numerical control instruction is a G-code instruction;
   (e) changing all other bits at the memory location to a second logical value if the numerical control instruction is a G-code instruction; and
   (f) executing numerical control processing in dependence upon the contents of the G-code memory.

5. A method according to claim 4, wherein step (f) comprises executing numerical control processing in dependence upon the numerical control instructions using the contents of the G-code memory as control data.

* * * * *